Jan. 10, 1967   J. BAUDER ET AL   3,297,245
DEVICE FOR CONTROLLING A COUNTER COMPRISING MATRIX
WIDTH AND SPACE LINE-WEDGE INDICATORS IN A KEY
ACTUATED COMPOSING PERFORATOR

Filed Nov. 27, 1961   4 Sheets-Sheet 1

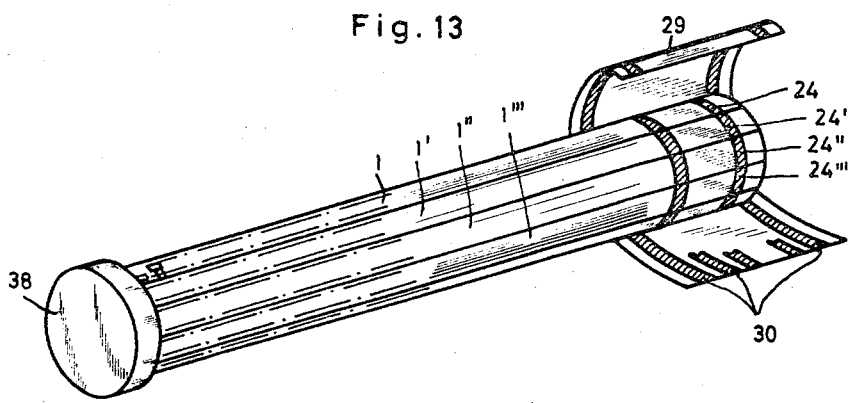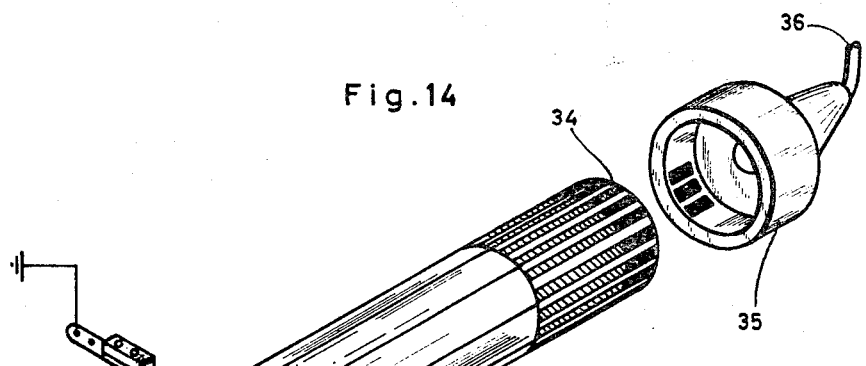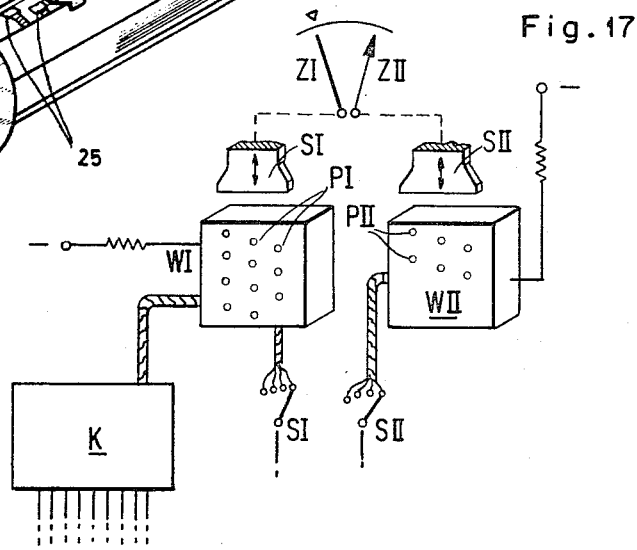

United States Patent Office 3,297,245
Patented Jan. 10, 1967

3,297,245
DEVICE FOR CONTROLLING A COUNTER COMPRISING MATRIX WIDTH AND SPACE LINE-WEDGE INDICATORS IN A KEY ACTUATED COMPOSING PERFORATOR
Josef Bauder, Munich-Solln, and Wolfgang Herrmann and Josef Swozil, Munich, Germany, assignors to Siemens & Halske Aktiengesellschaft Berlin and Munich, a corporation of Germany
Filed Nov. 27, 1961, Ser. No. 155,541
Claims priority, application Germany, Nov. 29, 1960, S 71,453
15 Claims. (Cl. 234—5)

This invention is concerned with a circuit arrangement and a device for controlling a counter comprising a matrix width indicator and a space line-wedge indicator in a key controlled composing perforator, said circuit arrangement containing among others an electrically modified, otherwise known device, for allocating or assigning predetermined symbol keys to predetermined magnitudes of pointer motion of the matrix width indicator and effecting such allocation or assignment in given cases, involving plural type keys, under consideration of the kind of type or case group.

The circuit arrangement according to the invention comprises a controllable device, and especially an electromagnetically controllable device, having a circuit containing for the determination of the magnitude of the pointer motion stages a selector switch for the setting of the magnitude of the minimum word clearance or intervening space allocated to the actuation of the space line-wedge key, and a selector switch for the maximum word clearance or intervening space, or the difference between the maximum and minimum word clearance, respectively. Such construction simplifies the servicing and reduces the space requirements. Moreover, cumbersome mechanical control means, such as they are required in known devices of this kind, are eliminated.

According to another feature of the invention, there is provided, in connection with a common pointer or indicator for the sum of the matrix width plus the sum of the word clearances or intervening spaces corresponding to the minimum space line-wedge settings, a device for the setting of the motion of the corresponding indicator, which device is common to these values.

According to a further feature of the invention, there is provided, in connection with composing perforators having customarily plurally utilized keys, a contact set which can be operatively actuated by each key assigned to a symbol or character, said contact set being equipped with individual contacts which are according to the plural utilization of the keys respectively circulated in a plurality of actuating circuits, only one of these circuits being at any time operatively effective under control of a type group or type case switch.

In a circuit arrangement of the above indicated kind, the device for the electrical allocation of predetermined character or symbol keys to given indicator motions, is in accordance with a preferred embodiment of the invention constructed in the manner of a crossbar distributor or modification thereof.

Further details of the invention will appear from the claims and from the description which will be rendered below with reference to the accompanying drawings showing embodiments thereof.

Figure 5:
Figure 6:
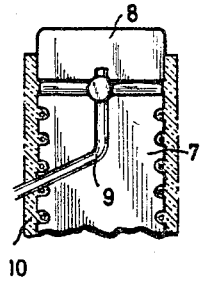
Figure 4:
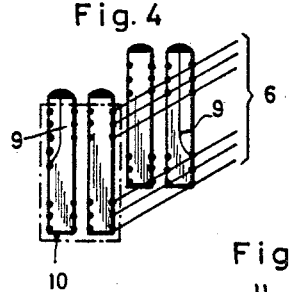
Figure 7:
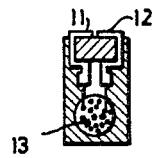
Figure 8:
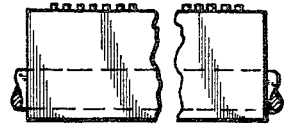
Figure 15:
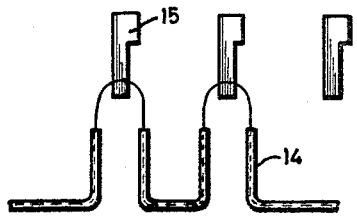
Figure 16:
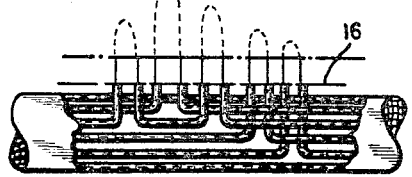
Figure 9:
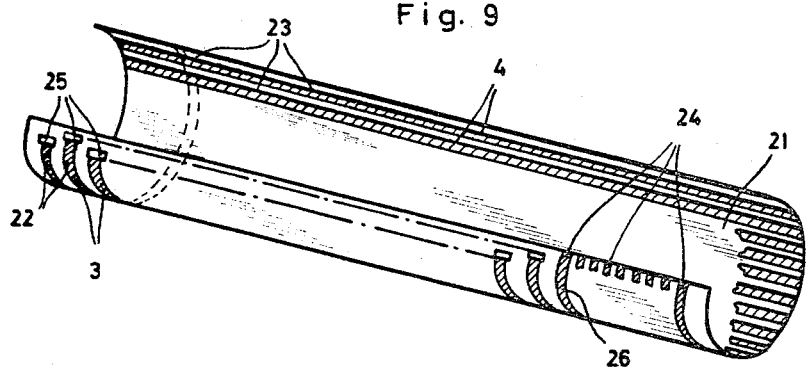
Figure 10:
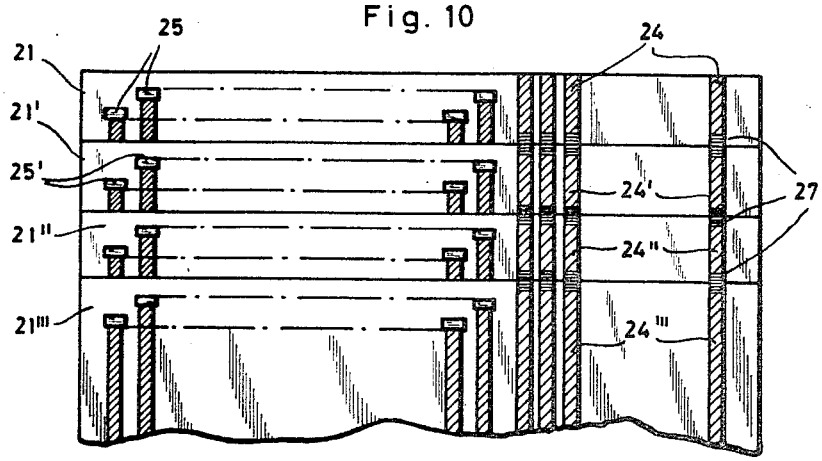
Figure 11:
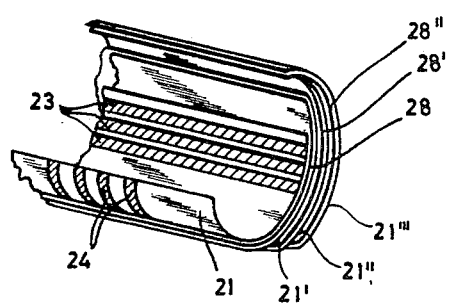
Figure 12:
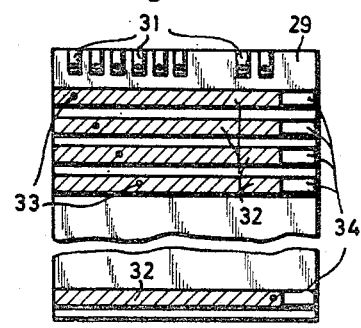

FIGS. 5 and 6 indicate examples of constructions of an embodiment according to FIG. 4;

FIGS. 7 and 8 illustrate respectively in cross-sectional view and side view a further embodiment of the distributor;

FIGS. 9 to 14 represent the construction of a device for the selection of one of a plurality of distributors. In these figures, FIG. 9 shows an embodiment of the distributor;

FIG. 10 shows in frontal view the manner of assembling and circuiting a plurality of distributors;

FIG. 11 is a fractional perspective view to aid in explaining FIG. 10;

FIG. 12 shows a connecting sleeve or collar;

FIG. 13 shows in perspective view the manner of assembling the parts of FIGS. 10 and 12;

FIG. 14 is a perspective view of the distributor and the selection device;

FIG. 15 illustrates structural details of a distributor made of successively extended insulated wires;

FIG. 16 explains the manner of making a distributor employing the features shown in FIG. 15, and FIG. 17 schematically represents the indicating devices WI and WII.

Figure 1:
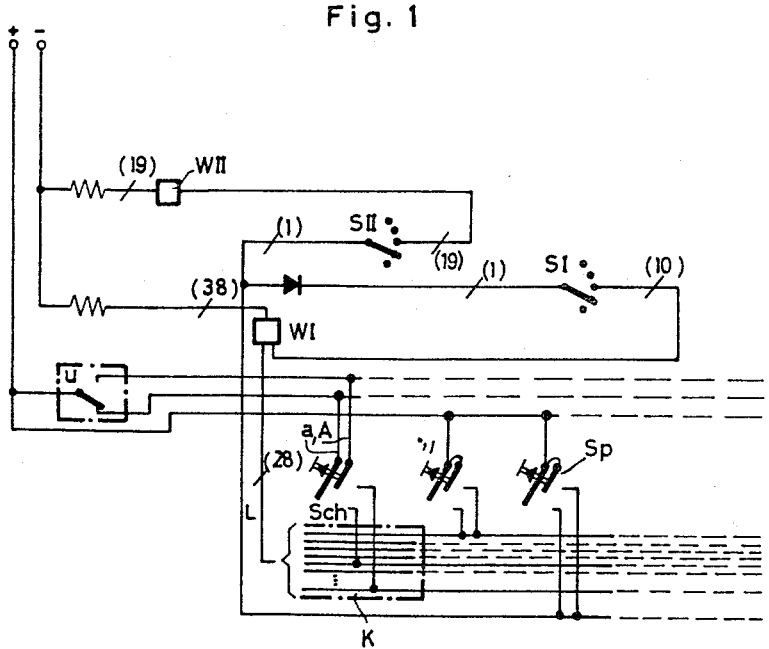
FIG. 1 represents a circuit explaining the principles involved in the invention.

It will be seen from FIG. 1 that the circuit arrangement contains two principally different kinds of circuits, one such circuit extending from the positive pole of a current source over a type- or case group switch $u$ to the switches $Sch$ which are respectively allocated to or associated with individual symbols or characters, for example A$a$. The counting values which are decisive for the setting of the matrix width indicators are adjustable over these switches with the aid of a crossbar distributor indicated at K. There is for this purpose provided a cable, for example a 28-conductor cable L which extends from the crossbar distributor K to a device WI serving for the electromagnetic determination of the magnitude of the indicator or pointer motion of the matrix width indicator. The device WI is controlled over a manually operable selector switch SI, referred to as space line-wedge switch for minimum space line width, in a circuit extending over the switch $Sp$ which is operable by the spacing key. An auxiliary electromagnetic control device WII is upon actuation of the spacing key operable in a circuit extending over a further selector switch SII, referred to as space line-wedge switch for maximum less minimum space line wedge width, such auxiliary device WII determining the magnitude of the indicator motion stages of a space line-wedge pointer which is in known manner adjustable in accordance with the difference between the minimum and maximum space line-wedge width of the selected space line-wedge.

For the purpose of allocation to selectible minimum width of the space line wedge, there are provided, for example, ten (10) lines, extending from the selector switch SI to the device WI, one such line being selected in a given case by the actuation of the switch SI; and for the allocation to a selectible difference between maximum and minimum width of the space line wedge, there are provided, for example, nineteen (19) lines, extending from the selector switch SII to the device WII, one such line being likewise selected in a given case by the actuation of the switch SII.

FIG. 17 schematically illustrates the operating connections of the devices WI and WII, in which the respective devices may be constructed in the manner illustrated in Patent No. 3,043,500. Thus the device WI is provided with a plurality of retractable pins PI, which may be magnetically actuated, forming stock members for a vertically movable member SI, suitably connected to a pointer ZI. In like manner the device WII is provided with pins PII cooperable with member SII for the actuation of a pointer ZII. Details of the construction of the devices WI and WII as well as the mechanical connections to the respective points, forms no part of the present invention. The mechanical indicating means may be of any suitable construction, as for example of the type illustrated in Patent No. 2,024,006.

As is customary in connection with composing perforators, there are provided additional switches which are respectively controlled by further keys serving for operations such, for example, as "Elevation," "Normal," "Common," such switches being omitted for the sake of simplification and clarity.

Figure 2:
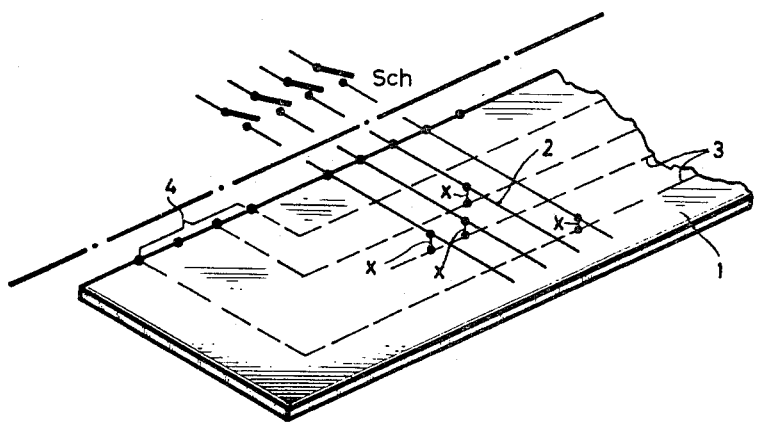
FIGS. 2, 3 and 4 show principles involved in the construction of embodiments of distributors operating in the manner of crossbar devices.

The crossbar distributor K can be constructed, for example, as schematically indicated in FIG. 2, with the aid of a circuit plate 1 which is on the one side provided with parallel lines 2, such lines extending, for example, to 128 key controlled switches Sch. Upon the other side of the plate 1 are provided, for example, 40 parallel lines 3 which may extend to 40 output points 4. Desired inputs coming from the respective switches Sch can be connected with desired outputs by means of connections established at points x.

Figure 3:
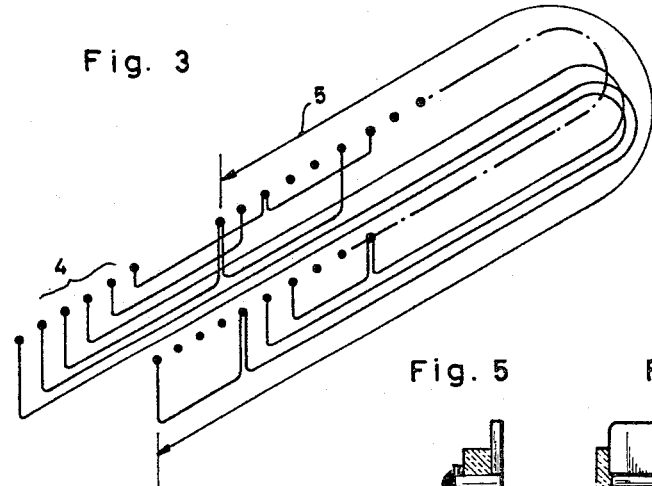

FIG. 3 shows in schematic manner a similarly operating distributor which is constructed, for example, with the aid of a line bundle, such bundle being folded upon itself so as to reduce the overall dimensions of the arrangement. Numeral 5 indicates the inputs and the outputs are again indicated by numeral 4.

FIGS. 4, 5 and 6 show an embodiment of a crossbar distributor comprising, for example, 40 bare wires 6, such wires being embedded in groups of 10 wires, respectively on each side of a series of insulating plates 7. Each such insulating plate is provided with a conductive terminal head 8 which can be connected by means of a wire 9 with a desired one of the wires 6. Each two of the insulating plates are in the manner indicated in FIGS. 4 and 6 encased in a molded mass 10, forming thus a unitary and exchangeable structural component.

FIG. 8 shows an analogous arrangement of an insulated line bundle 13 and, as is apparent from FIG. 7, terminal members 11 and 12 connected therewith. The entire arrangement may correspond to the one shown in FIG. 3.

The crossbar distributor arrangement shown in FIG. 9 corresponds as to its properties to the one explained with reference to FIG. 2. The circuit plate 21 is flexible and may form, for example, part of the superficies of a cylinder. The conductors extending on the inside of the circuit plate are indicated by numeral 23, and those extending perpendicularly thereof on the outside are indicated by numeral 22. The conductors may be of the printed or etched type. The terminal members of the conductors, extending along two lines of the superficies, are indicated by numeral 25. At the outside of the right end of the circularly rolled plate are provided conductors 24 extending in parallel to the conductors 22, such conductors 24 serving to interconnect the conductors 23 with the aid of transverse contacting means 26, with their respective output terminals which will presently be explained more in detail.

As is apparent from FIGS. 10 and 11, a plurality of circuit plates 21, 21', 21'', 21''' can be arranged in angularly staggered relationship so that the respective terminals 25, 25' . . . etc. project at the surface of the drum-like structure formed by the assembled cylindrical members. The conductors 24, 24', 24'', 24''' are thereby interconnected by conductive bridges 27 so as to form a unit. Between the individual circuit plates are provided insulating foils 28, 28', 28'' . . . etc.

In order to assure reliable extension of the conductors 24, the end of the structure containing such conductors is surrounded by a likewise flexible sleeve-like component 29 (FIGS. 12 and 13), made of insulating material, which is on the inside thereof provided with conductor strips 30 (FIG. 13), such strips being in engagement with the respective conductors 24, the strips 30 being in turn at one end thereof by transverse contacting means connected with outwardly disposed short conductor strips 31 (FIG. 12). Bridges (not shown), corresponding to the conductive bridges 27 (FIG. 10) are provided between the conductors 31 and 24 in order to assure a reliable and durable connection between the conductor strips 24 and 30.

In order to extend the respectively allocated terminals axially to the outside, there are provided, as shown in FIGS. 12 and 14, on the surface of the sleeve 29, axially extending conductor strips 32 which are respectively connected by transverse contacting means 33 with the inwardly disposed conductor strips 30.

The right hand end of the structure with the conductive strips 32 forms, as shown in FIG. 14, a plug 34 to which can be jacked a plural-terminal bushing 35 which is connected with a cable 36.

The respective terminal members 25 (FIGS. 10 and 14) are conductively connected each with a terminal brush such as shown in FIG. 14 at 37. There are provided, for example, along two neighboring lines of the superficies, a total of 128 such terminal brushes.

The drum formed by the circuit plates 21, 21' . . . etc. is in suitable manner (not shown) rotatably journalled and provided with a knob 38 (FIG. 14) so as to enable rotation thereof for the purpose of selecting the respective crossbar distributors as desired with given types of symbols.

As shown in FIGS. 15 and 16, the construction of a crossbar distributor may be modified by drawing from individual conductors of a bundle of insulated conductors, at desired connecting points, loops such as indicated at 14, stripping portions of such loops of insulation, and connecting the respective stripped portions, for example, by soldering, with terminal contacts such as indicated at 15. The production of such a structure can be greatly simplified by drawing from a conductor bundle, at desired points, relatively long loops extending laterally to one or two sides and perpendicularly to the bundle axis, binding the conductors to impart to the bundle its final shape, aligning desired loops so as to position them, as the case may be, in one or two lines such as 16 extending parallel to the bundle axis, cutting the respective loops along the corresponding lines, and thereafter stripping part of the insulation therefrom and connecting the stripped portions with terminal members.

In the event that only one distributor is to be provided in a composing perforator, that is, that there is no possibility for selection between a plurality of built-in distributors, it is of advantage to make the distributors exchangeable and to place them with the aid of an eccentric lever and if desired positioning pins or the like, in proper terminal position with respect to cooperatively disposed contacts.

It is within the scope of the invention possible, for example, by appropriate modification of the circuit, to provide in place of the selector switch SII which is allotted to the difference between maximum and minimum width of the space line wedge, a selector switch of this type alone for the maximum width of the space line wedge, such latter switch permitting in conjunction with the switch SI selection of a circuit for the device WII.

Changes may be made within the scope and spirit of the appended claims which define what is believed to be new and desired to have protected by Letters Patent.

We claim:

1. An arrangement for controlling, in connection with a key operated composing perforator, a counting device having a common indicator for the sum of the matrix width plus the sum of the word clearances corresponding to the minimum settings of the width of the space line wedges, comprising a first circuit containing an electromagnetically controlled device for determining the magnitude of the indicator motion stages, a second circuit containing an electromagnetically controlled device for determining the magnitude of the motion stage of a space wedge indicator, a common indicator for the sum of the letter widths plus the sum of the minimum word spacing corresponding to the wedge adjustments, said indicator being operatively connected to and governed by said first electromagnetically controlled device, two multiple switches, one of which switches is disposed in said first circuit and adjustable in accordance with the desired minimum word clearance or intervening space wedge, such switch lying in series with the first electromagnetic control device with the latter being under control of the intermediate space key switch, and the other switch being adjustable in accordance with the desired difference between the maximum and minimum word clearance or space wedge, the latter switch extending in series relation with the intermediate space key switch and the second electromagnetic control device, and in parallel to the first circuit.

2. An arrangement according to claim 1, for use in connection with composing perforators having plurally utilized keys controlled by a type group switch, comprising a contact set having individual contacts which are in accordance with the plural utilization of the keys respectively disposed in parallel extending operating circuits, said contact set being operatively actuated by each key assigned to a symbol, only one of said parallel circuits being operatively effective over a circuit controlled by the type group switch.

3. In an arrangement according to claim 2, a device for electrically allocating given symbol keys to given magnitudes of indicator motion, said device being constructed in the manner of a crossbar distributor.

4. A device according to claim 3, comprising a conductor bundle having a number of wires corresponding to the number of count values, each wire being connected with a terminal at a number of points corresponding to the number of inputs plus the number of outputs.

5. A device according to claim 4, wherein said wires are insulated wires which are respectively extended from the bundle directly at the terminal points therefor.

6. A device according to claim 4, wherein said wires are insulated wires which are respectively looped from the bundle directly at the terminal point therefor.

7. A device according to claim 3, wherein said distributor is made in the form of a printed circuit plate.

8. A device according to claim 3, wherein said distributor is made in the form of a printed circuit plate having on each side thereof mutually parallel disposed conductive tracks extending perpendicularly to the tracks on the other side of the plate, predetermined tracks on one side of said plate being conductively interconnected with tracks on the other side at crossing areas of such tracks.

9. A device according to claim 3, wherein said distributor is made of a plurality of printed circuit plates laminated with interposition of insulating material between individual plates, and a symbol type selector connected with said plates.

10. A device according to claim 9, wherein said plates are flexible and assembled to form a structure in the general shape of a cylinder, whereby terminal points of the conductors which are disposed perpendicularly to the superficies lines on the partial superficies and facing outwardly therefrom and extending to key contacts, are arranged along one or more neighboring superficies lines, and whereby similar terminal points of the individual printed circuits are mutually staggered along the superficies of the cylinder, and means for angularly selectively adjusting the cylinder with respect to brush-like cooperatively arranged contacts.

11. A device according to claim 10, wherein each of the conductors extending along superficies parallel to the axis of the cylinder is at one end of said cylinder connected in crossbar manner at the cylinder superficies with one of a corresponding number of conductors extending perpendicularly thereto, and wherein the terminals of these conductors of all partial distributors extend to a sleeve-like collective terminal member which comprises a corresponding number of relatively short terminal conductors extending along superficies lines at the respective end of the cylinder.

12. A device according to claim 11, wherein the ends of the terminal conductors extending along superficies lines form a multi-terminal plug.

13. A device according to claim 4, wherein bare wires are embedded in recessed insulating parts containing at least partially leads extending to the terminals.

14. A device according to claim 13, wherein a staple of insulated circuit plates is embedded in a molded mass.

15. A distributor device according to claim 14, which is exchangeably disposed in a composing perforator.

References Cited by the Examiner

UNITED STATES PATENTS

| | | | |
|---|---|---|---|
| 2,678,713 | 5/1954 | Higonnet et al. | 234—4 |
| 2,847,919 | 8/1958 | Rossetto et al. | 234—4 |
| 2,848,049 | 8/1958 | Robbins et al. | 234—7 |
| 2,865,270 | 12/1958 | Higonnet et al. | 234—5 |
| 2,999,434 | 9/1961 | Higonnet et al. | 234—4 |
| 3,061,182 | 10/1962 | Corrado et al. | 234—5 |
| 3,083,897 | 4/1963 | Vierling et al. | 234—5 |
| 3,106,336 | 10/1963 | Dirks | 234—5 |

FOREIGN PATENTS

| | | |
|---|---|---|
| 724,870 | 2/1955 | Great Britain. |

WILLIAM S. LAWSON, *Primary Examiner.*

FRANK H. BRONAUGH, J. SPENCER OVERHOLSER, ANDREW R. JUHASZ, *Examiners.*